United States Patent [19]

Smith

[11] 3,833,439

[45] Sept. 3, 1974

[54] METHOD OF DIELECTRICALLY EMBOSSING RISERS IN A TRIM ASSEMBLY

[75] Inventor: Kenneth A. Smith, Washington, Mich.

[73] Assignee: General Motors Corporation, Detroit, Mich.

[22] Filed: July 24, 1972

[21] Appl. No.: 274,821

[52] U.S. Cl............... 156/219, 156/250, 156/252, 156/261, 156/267, 156/272, 156/292, 161/117, 161/119
[51] Int. Cl............................................. B31f 7/00
[58] Field of Search ........... 156/209, 219, 220, 290, 156/250–252, 261, 262, 272, 252, 245, 211, 267, 213, 70; 225/2–4, 97; 83/4, 19, 17, 16; 264/160, 163; 161/117, 119

[56] References Cited
UNITED STATES PATENTS

| | | | |
|---|---|---|---|
| 2,982,456 | 5/1961 | Hsu et al.......................... | 225/2 |
| 3,026,233 | 3/1962 | Scholl et al..................... | 156/272 X |
| 3,047,451 | 7/1962 | Beck et al....................... | 156/251 X |
| 3,116,569 | 1/1964 | Kramer........................... | 156/245 X |
| 3,219,506 | 11/1965 | Dusina et al................... | 156/290 |
| 3,320,108 | 5/1967 | Lande.............................. | 156/219 |
| 3,518,334 | 6/1970 | Carrigan et al................. | 264/160 X |
| 3,623,209 | 11/1971 | Zuhlke et al.................... | 264/163 X |
| 3,673,300 | 6/1972 | Muhlbach et al................ | 264/160 |

Primary Examiner—Charles E. Van Horn
Assistant Examiner—David A. Simmons
Attorney, Agent, or Firm—E. J. Biskup

[57] ABSTRACT

A method for making a decorative trim assembly with a dielectric embossing press in which one of the electrodes includes a plurality of spaced embossing blades and the other electrode has a flat face formed by a yieldable material. The method comprises the steps of preforming a sheet of thermoplastic material with a plurality of risers defined by spaced trim lines followed by placing the sheet on the electrode with the embossing blades contacting the trim lines. Afterwards, a coextensive sheet of filler material is positioned onto the sheet of thermoplastic material and the electrodes are moved toward each other so as to cause the embossing blades to compress the cover sheet and the sheet of filler material into the yieldable material. Sufficient pressure is then applied to the composite sheets to cause the sheet of filler material to be split along the embossing blades to form a plurality of separate strips. This is followed by opening the press and placing a base sheet over the strips of filler material and dielectrically bonding the sheet of thermoplastic material to the base sheet along the trim lines.

4 Claims, 12 Drawing Figures

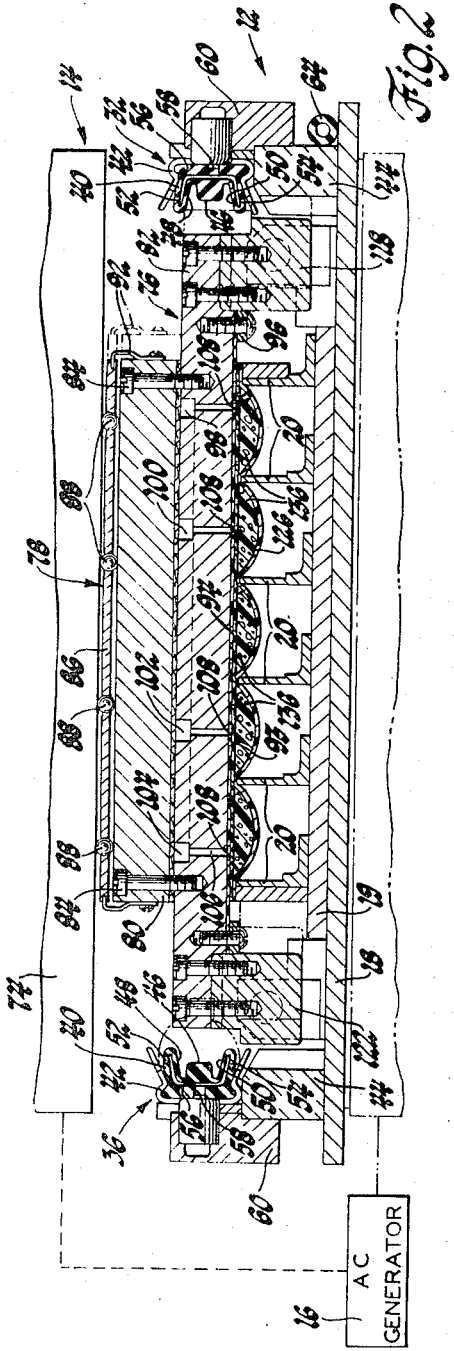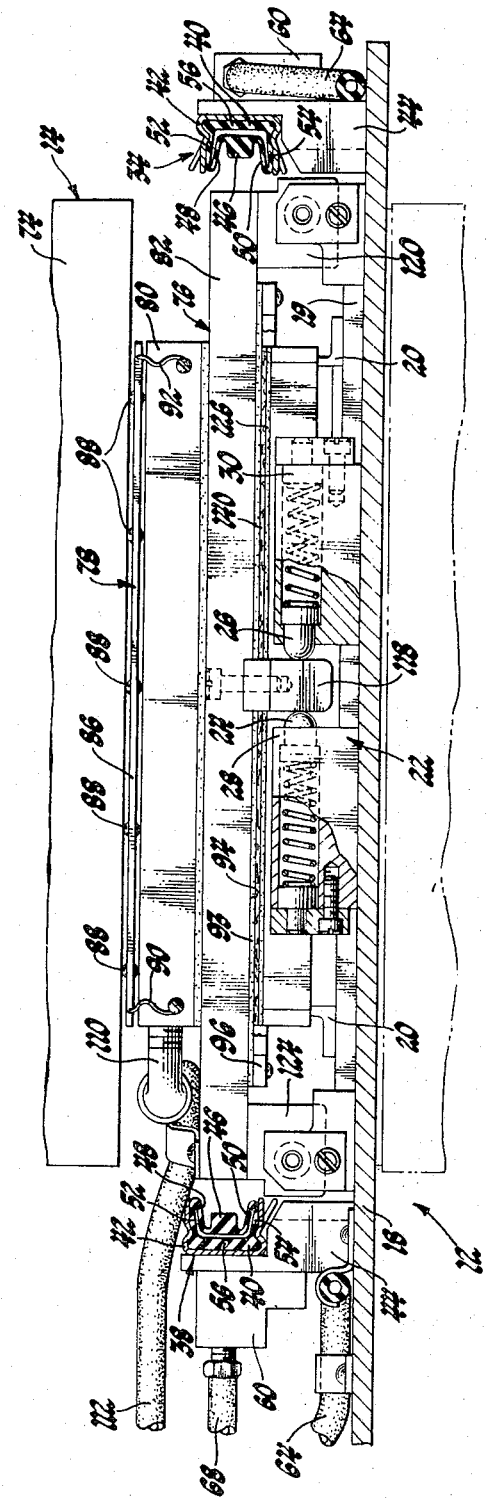

METHOD OF DIELECTRICALLY EMBOSSING RISERS IN A TRIM ASSEMBLY

The invention concerns a dielectric embossing method for forming a plurality of risers in a decorative trim assembly of the type that may be used for covering the seats in an automobile. One method presently used for forming risers in trim assemblies consists of positioning a laminate of trim materials onto a plurality of parallel upstanding blades of a dielectric embossing press. The laminate usually consists of a cover sheet made of thermoplastic material, a filler pad, and a base sheet. The filler pad usually takes the form of a cotton type material which is impregnated with a heat fusible plastic; and when the assembly is dielectrically embossed, the blades serve to bond the cover sheet to the base sheet through the filler pad with the plastic in the latter being melted and cured along the embossed lines and serving as the bonding adhesive. As is well known, the greater the loft provided by the risers, the more attractive the trim assembly is to the observer in that it appears to provide a more luxurious cover. By using the aforedescribed process, however, it has been found that the thickness of the filler pad and, accordingly, the height of the riser must be limited to some extent because the embossing blades are required to compress the filler pad for forming the trim lines and at the same time must provide a bond through the compressed material to the base sheet. It is inevitable that during such operation, a certain amount of the filler pad is located between the cover sheet and the base sheet along the trim line so as to prevent direct bonding therebetween. As a result, a maximum height riser cannot be obtained when utilizing the aforedescribed method.

The present invention concerns a method for dielectrically embossing and forming a trim assembly with risers of increased height. In this case, the filler pad is made from a polyurethane foam type material having a relatively low tensile strength and percent elongation so as to allow the material to separate when subjected to compression along relatively thin lines. The method according to the invention forms the filler pad into a plurality of strips which subsequently are pressed between the embossing blades followed by a lateral shifting of the base sheet in a reciprocating fashion. The latter movement of the base sheet serves to assure that the strips are located between the embossing blades and also serves to remove any particles of the filler pad remaining above the blades due to the compression cutting operation of the filler pad.

The apparatus utilized for practicing the invention comprises a lower electrode which supports a series of substantially parallel upstanding embossing blades which serve to initially support the cover sheet and the filler pad. A plate member which can be attached to the upper electrode has a flat lower face made of yieldable material which is adapted to be lowered into physical engagement with the filler pad and under the urging of the upper electrode serves to compress the filler pad with sufficient force so as to cause the latter to be split into individual strips by the embossing blades. In addition, the plate member incorporates vacuum operated means for holding the base sheet to the flat face after which the plate member is reciprocated in a plane parallel to the flat face for clearing the area above the embossing blades as described above. The reciprocating movement of the plate member is accomplished through air-actuated actuators supported by the lower electrode on opposite sides of the plate member.

Accordingly, the objects of the present invention are to provide a method for forming risers in a trim assembly that utilizes a dielectric embossing press for splitting a filler pad into a plurality of strips; to provide a method for dielectrically forming a trim assembly with risers that reciprocates a base sheet in a horizontal plane so as to assure that precut filler strips for the risers are located between the embossing blades; and to provide a method of dielectrically embossing risers into a trim assembly wherein a base sheet is reciprocated relative to a cover sheet so as to clean the area located on the cover sheet above the embossing blades prior to dielectrically bonding the sheets together.

Other objects and advantages of the present invention will be apparent from the following detailed description when taken with the drawings in which:

FIG. 2 is a sectional view of the apparatus of FIG. 1 taken on line 2—2;

FIG. 3 is a sectional view of the apparatus of FIG. 1 taken on line 3—3;

Figure 1:
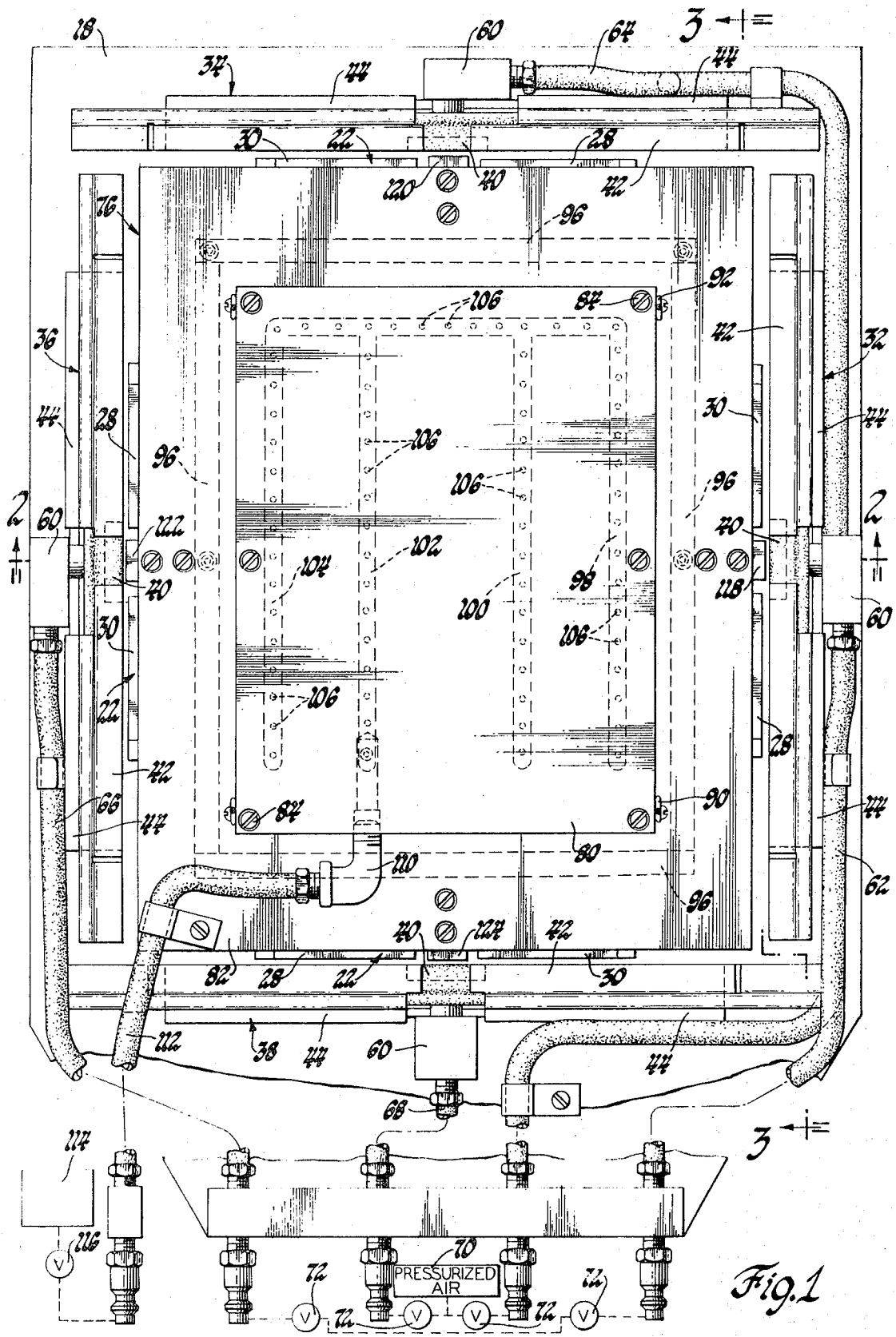
FIG. 1 is a plan view showing a dielectric embossing apparatus used for practicing the invention.

Referring to the drawings and more particularly FIGS. 1, 2 and 3 thereof, a dielectric embossing press is shown comprising a lower stationary electrode 12 and an upper movable electrode 14, both of which are connected in series with a high frequency alternating current generator 16. The upper electrode 14 is movable along a vertical axis through operating means (not shown) toward and away from the lower electrode 12, while the generator 16 is capable of impressing an alternating current at a frequency between 1 and 100 megacycles between the electrodes.

The lower electrode 12 includes a fixed base frame 18 which rigidly carries a rectangular support 19 having a plurality of identical upstanding parallel embossing blades 20, all of which are of uniform height and length and serve to support a trim assembly in a manner that will be described hereinafter. As best seen in FIG. 2, the embossing blades 20 are equally spaced from each other so as to provide risers of equal width in the trim assembly to be formed. It will be understood that the spacing between the embossing blades 20 can be varied depending upon the particular design effect which one wishes to provide in the trim assembly. Adjacent each side of the support 19 is a centering device 22 consisting of a pair of spring biased plungers 24 and 26 respectively housed within suitably bored retainers 28 and 30 as seen in FIG. 3. Each centering device 22 is centrally located intermediate the ends of each side of the support 19 and is rigidly secured to the base frame 18. The support 19 is also surrounded by four identical actuator devices 32, 34, 36 and 38 which together form a rectangle. Each actuator device includes an elongated expandable member 40 made of rubber or a similar elastomeric material and, in its normal position, takes the form as shown in FIG. 2. Each of the expandable members 40 has a hollow interior and extends substantially the full length of a support bracket 42 rigidly secured to a stanchion 44 which in turn is fixed with the base frame 18. In cross section, the expandable member 40 is generally E-shaped and comprises an outwardly projecting plunger 46 integrally formed with a pair of diverging arms 48 and 50. The arms 48 and 50 in turn are integral with a pair of legs 52 and 54 which are fixed with a vertically extending base 56 held by the support bracket 42. The expandable member 40 is sealed at the opposite ends thereof so as to form a completely enclosed chamber which communicates through a port 58 with a fitting 60 which in turn is connected with a flexible hose. Thus, as seen in FIG. 1, the actuator devices 32, 34, 36, and 38 connect with hoses 62, 64, 66, and 68 respectively which in turn lead to a source of pressurized fluid indicated by the numeral 70. A suitable valve 72 is located in each of the air lines for selectively controlling air to the actuator device for expanding the member 40 into the phantom line position as shown in FIG. 2.

The upper electrode 14 includes the usual support member 74 which in this case abuts the upper portion of a plate member 76 through a bearing assembly 78 as shown in FIG. 2. The plate member 76 consists of two rectangular plates 80 and 82 fixed together by a plurality of cap screws, two of which are indicated by the numeral 84. Interposed between the plate member 76 and the support member 74 is the bearing assembly 78 which consists of a rectangular retainer plate 86 having a plurality of spherical balls 88 supported thereby. A pair of spring clips 90 and 92 are located on opposite sides of the retainer plate 86 to hold the latter in position on the upper plate 80. Although not shown, the plate member 76 can be carried by the support member 74 through a means which permits the plate member 76 to retain engagement with the support member 74 as shown in FIG. 2 and at the same time permits the plate member 76 to be moved laterally as a unit in a horizontal plane in a manner which will be hereinafter discussed.

The plate member 76 has a lower flat face 94 which is covered by a sheet 93 of silicone rubber which is approximately 0.020 inch thick and that is held to the plate 82 by four elongated relatively thin bars, each of which is indicated by the numeral 96. In addition, the plate member 76 is formed with a series of interconnecting passages 98, 100, 102 and 104 which connect with a plurality of ports 106 which communicate with registering openings 108 formed in the sheet 93 of silicone rubber. It will be understood that a sufficient number of ports 106 and registering openings 108 are provided so that a sheet of material of the type which will hereinafter be described can be held by the plate member 76 when the passages 98, 100, 102 and 104 are connected through the elbow fitting 110 and hose 112 with a source 114 of fluid at subatmospheric pressure. A valve 116 selectively controls the supply of subatmospheric pressure to the aforementioned passages. It will also be noted that the lower plate 82 rigidly supports four downwardly depending tongues 118, 120, 122 and 124, each of which is adapted to be located between the plungers 24 and 26 of one of the centering devices 22 as shown in FIG. 3. Thus, with the plate member 76 located in the position of FIG. 2, the centering devices 22 located on opposite sides of the plate member 76 serve to center the latter relative to the actuator devices 32, 34, 36 and 38.

Figure 4:
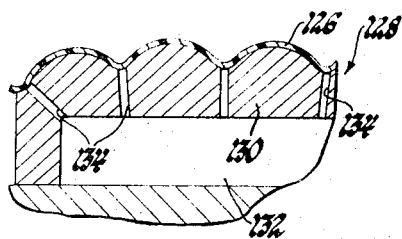
FIG. 4 is a view showing a thermo-forming mold used for preforming the cover sheet of thermoplastic material used with the invention.
Figure 5:
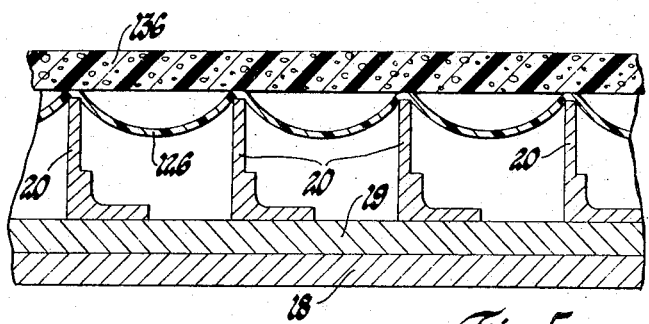
FIG. 5 shows the embossing blades of the apparatus of FIGS. 1 through 3 supporting the preformed cover sheet and a sheet of polyurethane foam.

In utilizing the apparatus described above, initially the dielectric embossing press is opened by raising the upper electrode 14 so as to expose the embossing blades 20 shown in FIG. 2. A preformed cover sheet 126 of unsupported thermoplastic material is positioned on the upper end of the embossing blades 20 as shown in FIG. 5. In this regard, it will be noted that the preformed sheet 126 will have a plurality of risers formed therein. The risers will be spaced a distance which equals the spacing between the embossing blades and can be formed with a thermo-forming mold 128 such as shown in FIG. 4 or by an embossing method such as disclosed in Ananian et al U.S. Pat. No. 3,265,551. Both of these methods are well known in the art and, accordingly, it only need be mentioned that the thermo-forming method consists of having a preheated sheet of thermoplastic material drawn onto a suitably formed die member 130 under the influence of subatmospheric pressure connected with a chamber 132 which connects with a plurality of outwardly extending ports 134. The process disclosed in Ananian et al consists of compressing a cover sheet of yieldable material against a sheet of thermoplastic material and into an area between the embossing blades and thereafter applying an alternating current of radio frequency to the portions of the cover sheets contacting the blades so as to soften the material and remove any tension in the cover sheet. The applied pressure is then removed to permit the yieldable material to return to its normal form and leave hollow risers in the trim sheet. As should be apparent, other methods can be utilized for preforming the cover sheet 126 with risers so that the cover sheet can be placed on the embossing blades 20 as seen in FIG. 5 and have the valleys located as shown. It will also be understood that the cover sheet 126 should be made from a plastic such as vinyl chloride, vinylidene chloride, or any other similar synthetic which can be preformed as explained above and is compatible with a dielectric embossing process. One type of cover sheet utilized successfully for practicing the process was a vinyl coated, crimp-knit nylon fabric manufactured by Uniroyal, Inc., and indentified as No. S-8691, dated June 26, 1969.

With the cover sheet 126 positioned as seen in FIG. 5, a coextensive sheet 136 of polyurethane foam material is placed on top of the cover sheet 126. One sheet of foam material used with the cover sheet 126 had a thickness of approximately 0.375 inch and was obtained from General Tire & Rubber Company and identified as Composition 04-24-0. Other thicknesses of the sheet 136 obtained from General Tire & Rubber Company were in the range between 0.125 inch and 0.500 inch and also were used successfully for practicing this splitting operation. Each sheet 136 of foam material consisted of a closed cell polyurethane foam having a density of about 2 pounds per cubic inch and a tensile strength between 8 and 9 psi. The foam material also had an elongation in the 80–90 percent range. Any other type of polyurethane foam material can be used so long as its tensile strength and percent elongation are low enough to allow the foam material to be split under the conditions used in the process for making the trim assembly as described hereinafter.

Figure 6:
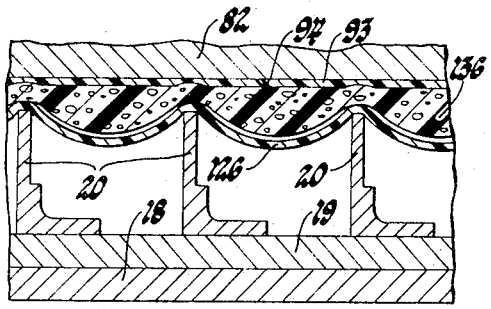
FIG. 6 shows the assembly of FIG. 5 being compressed between the upper electrode and the lower electrode.
Figure 7:
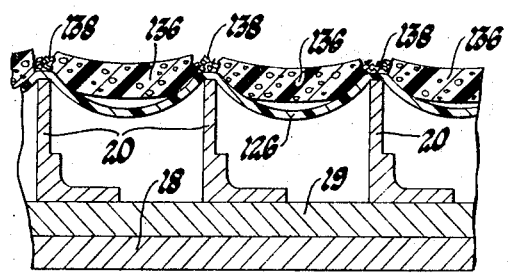
FIG. 7 shows the polyurethane foam split into a plurality of strips as a result of the operation shown in FIG. 6.

After the sheet 136 of foam material is placed onto the cover sheet 126, the dielectric embossing press is closed as seen in FIG. 6, and both the cover sheet 126 and the sheet 136 of foam material are subjected to an applied pressure of about 700 psi. The top surfaces of each of the embossing blades 20 cause the cover sheet 126 to be pressed into the sheet 136 of foam material which in turn tends to elongate at its upper surface as it moves into the sheet 93 of silicone rubber carried by the plate member 76. This action causes the portions of the sheet 136 located between the embossing blades 20 to be physically torn away from each other so as to form a plurality of elongated rectangular strips of foam material as seen in FIG. 7. It has been found that the tearing or separating action that occurs between the strips of foam material due to the pressure applied by the embossing blades 20, results in a number of fragmented particles 138 settling between adjacent strips and resting on the cover sheet 126 immediately above the upper surface of some of the embossing blades 20 as seen in FIG. 7. Such particles 138 could prevent the cover sheet 126 from bonding completely along the embossing blades 20 to the base sheet 140 seen in FIG. 8 and, for this reason, the particles 138 should be removed from the bonding area.

The base sheet 140 consists basically of a 5 ounce cotton osnaburg cloth having a checkerboard surface of plasticized vinyl resin which is formed on one surface of the sheet. The checkerboard pattern can be formed by first placing a sheet of the aforementioned cloth on a flat table and then placing a screen in contact with the cloth. One type of screen that can be used for making the checkerboard pattern consists of nylon threads which are stretched over a rectangular wooden frame with spacing which allows 30 threads per linear inch. Thereafter, a water dispersed vinyl latex such as Geon 576 manufactured by the B. F. Goodrich Company is poured over the screen so that the cloth is completely wetted by the latex. A squeegee is then used to scrape all excess latex away from the surface of the screen leaving only that liquid which is trapped in the screen opening. The screen is then lifted off the cloth leaving a controlled thickness of latex film on the cloth. Thereafter, the cloth is placed in an oven and dried for about 15 minutes at 200° F. It should be noted that it has been found that a coating density of from 4 to 10 ounces of the vinyl per square yard will provide an acceptable base sheet. This density can be varied by use of screens of varying coarseness.

Figure 8:
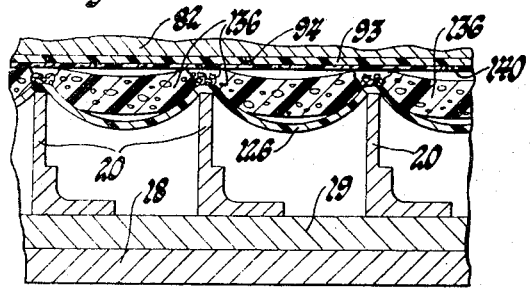
FIG. 8 shows the upper electrode supporting the base sheet and engaging the strips of FIG. 7.
Figure 9:
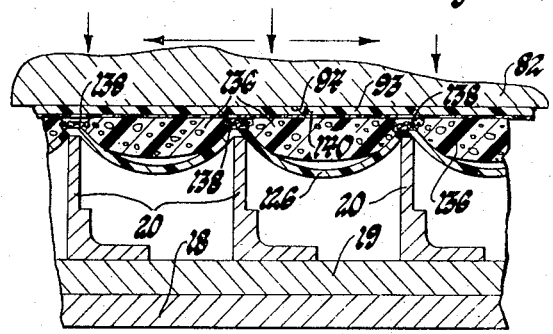
FIG. 9 shows the positions of the various elements of the trim assembly during the reciprocating movement of the plate member which forms a part of the upper electrode.
Figure 10:
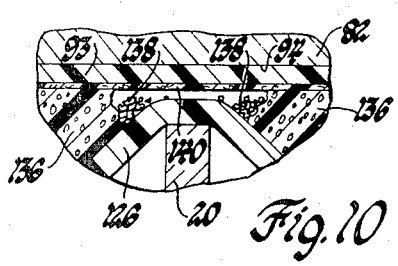
FIG. 10 is an enlarged view showing in detail the manner that the base sheet removes particles located above the embossing blades.

The base sheet 140 made as described above is placed on the strips of foam material as seen in FIG. 7 with the checkerboard pattern of vinyl facing and engaging the strips as seen in FIG. 8. The dielectric embossing press is then closed once again and the valve 116 is opened causing the base sheet 140 to be held by the plate member 76 as aforedescribed. A pressure of about 5 psi is then applied after which each of the valves 72 are sequentially opened and closed at a frequency of about 60 cycles per minute. As seen in FIG. 1, assuming valve 72 controlling actuator device 32 is opened and closed as indicated, the plate member 76 is caused to reciprocate in a horizontal plane along a first axis. Afterwards, the valve 72 controlling actuator 34 can be opened and closed at the same frequency causing the plate member 76 to reciprocate again, however, this time along an axis which is perpendicular to the first axis of movement of the plate member. As the plate member 76 reciprocates as seen in FIG. 9, the base sheet 140 moves with the plate member 76 and the checkerboard pattern of vinyl material extending from the base sheet 140 serves to move any particles 138 located between the strips out of an area immediately above the embossing blades 20. Thus, as seen in FIG. 10, the vinyl material projecting from the base sheet 140 serves to contact particles 138 and move them out of the area which will serve as the embossed trim lines of the trim assembly.

Figure 11:
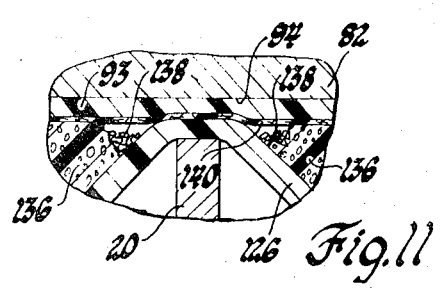
FIG. 11 is similar to FIG. 10 and shows the cover sheet being directly bonded to the base sheet.

After the plate member 76 has been reciprocated along the mutually perpendicular axes, the upper electrode 14 is moved downwardly further toward the lower electrode 12 so as to cause the embossing blades 20 to apply a pressure between 500 and 1,000 psi to the cover sheet 126 and the base sheet 140 located above each of the embossing blades. Thereafter, an alternating current is impressed across the upper and lower electrodes, the voltage being between 1,200 and 4,000 volts and at a frequency of between 1 and 100 megacycles. The electric field is generated between the electrodes for 10 seconds during which time the cover sheet 126 is fused to the base sheet 140 as seen in FIG. 11.

Figure 12:
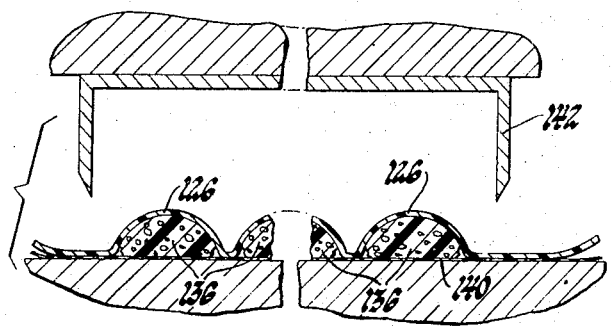
FIG. 12 shows the finished trim assembly with the risers being trimmed by a cutting tool.

After the heat cycle is completed, the upper electrode 14 is raised and the embossed trim assembly is removed from the press. As seen in FIG. 12, the panel, formed with risers having the increased depth, is then trimmed to the desired size by a cutting blade indicated generally by the numeral 142.

At this juncture, it will be noted that as seen in FIGS. 1 and 2, when the actuator device 36 is expanded into the phantom line position, it will cause the plate member 76 to shift to the right until the tongues 120 and 124 abut the retainer housings 28 and 30 on opposite sides of the plate member 76. When the pressure is removed from the actuator device and the latter is simultaneously connected with air at atmospheric pressure, the spring working against the depressed plungers in the centering devices urges the tongues 120 and 124 and accordingly the plate member 76 back to a central position. It has been found that the best results are obtained when the actuator devices on opposite sides of the plate member 76 are cycled alternately. This gives the plate member 76 the maximum amount of movement horizontally permitting the checkerboard lower surface of the base sheet 140 to act as a cleaner for removing any particles 138 located above an embossing blade 20. It will be understood that the aforesaid movement of the plate member 76 occurs even though pressure is being applied by the upper electrode 14 to the plate member 76. This is possible, of course, because of the bearing assembly 78 which allows movement of the plate member 76 by having the balls 88 roll against the upper surface of the support member 74.

Various changes and modifications can be made in this construction without departing from the spirit of the invention. Such changes and modifications are contemplated by the inventor and he does not wish to be limited except by the scope of the appended claims.

I claim:

1. A method for making a decorative trim assembly with a dielectric embossing press in which one of the electrodes includes a plurality of spaced embossing blades and the other electrode has a flat face formed by a yieldable material, comprising the steps of preforming a sheet of thermoplastic material with a plurality of risers defined by spaced trim lines, placing said sheet of thermoplastic material on said one of the electrodes with the embossing blades contacting the trim lines, positioning a coextensive sheet of filler material onto the sheet of thermoplastic material, applying pressure to the composite sheets whereby the embossing blades compress the cover sheet and the sheet of filler material into the yieldable material and cause the sheet of filler material to be split along the embossing blades to form a plurality of separate strips located between adjacent embossing blades, placing a base sheet over the strips of filler material, moving the base sheet relative to the cover sheet to position the strips between the embossing blades and to remove particles of the filler material from the trim line area, and dielectrically bonding the sheet of thermoplastic material to the base sheet along the trim lines.

2. The method of claim 1 wherein said sheet of filler material is made of polyurethane foam.

3. The method of claim 1 wherein the base sheet has a plurality of outwardly extending projections formed on one surface thereof and facing the strips of filler material, said projections being made from a vinyl material.

4. A method for making a decorative trim assembly with a dielectric embossing press in which one of the electrodes includes a plurality of spaced embossing blades and the other electrode has a flat face formed by a yieldable material, comprising the steps of preforming a sheet of thermoplastic material with a plurality of risers defined by spaced trim lines, placing said sheet of thermoplastic material on said one of the electrodes with the embossing blades contacting the trim lines, positioning a coextensive sheet of filler material onto the sheet of thermoplastic material, moving the electrodes toward each other so as to cause the embossing blades to compress the cover sheet and the sheet of filler material into the yieldable material, applying sufficient pressure to the composite sheets to cause the sheet of filler material to be split along the embossing blades to form a plurality of separate strips, attaching a base sheet formed with projections to the flat face of the other electrode so that upon closing the press the projections contact the strips of filler material, reciprocating the base sheet in its plane relative to the cover sheet so as to cause the projections to position the strips between the embossing blades and to remove particles of the filler material from the trim line area, and dielectrically bonding the sheet of thermoplastic material to the base sheet along the trim lines.

* * * * *